(12) United States Patent
Hess et al.

(10) Patent No.: US 9,340,068 B2
(45) Date of Patent: May 17, 2016

(54) VEHICLE WHEEL

(71) Applicant: BASF SE, Ludwigshafen (DE)

(72) Inventors: Heiko Hess, Lauterecken (DE); Gerhard Bohrmann, Boehl-Iggelheim (DE); Felix Aschwanden, Oetwil an der Limmat (CH)

(73) Assignee: BASF SE, Ludwigshafen (DE)

( * ) Notice: Subject to any disclaimer, the term of this patent is extended or adjusted under 35 U.S.C. 154(b) by 278 days.

(21) Appl. No.: 13/967,516

(22) Filed: Aug. 15, 2013

(65) Prior Publication Data

US 2014/0049096 A1    Feb. 20, 2014

Related U.S. Application Data

(60) Provisional application No. 61/683,735, filed on Aug. 16, 2012.

(51) Int. Cl.
*B60B 3/14*    (2006.01)
*B60B 30/08*   (2006.01)
*B60B 5/02*    (2006.01)

(52) U.S. Cl.
CPC .............. *B60B 30/08* (2013.01); *B60B 3/147* (2013.01); *B60B 5/02* (2013.01)

(58) Field of Classification Search
CPC ...................................................... B60B 3/147
USPC ........................................ 301/35.626, 35.629
See application file for complete search history.

(56) References Cited

U.S. PATENT DOCUMENTS

| 3,459,455 | A | * | 8/1969 | Penniman, Jr. | ............ | B60B 3/14 |
| | | | | | | 301/9.1 |
| 3,494,669 | A | * | 2/1970 | Reppert | .................... | B60B 3/14 |
| | | | | | | 301/35.629 |
| 3,759,576 | A | * | 9/1973 | Richter | ..................... | B60B 3/14 |
| | | | | | | 301/35.629 |
| 3,820,851 | A | * | 6/1974 | Longo et al. | .............. | B60B 3/14 |
| | | | | | | 301/35.629 |
| 3,834,766 | A | * | 9/1974 | Thousand | .................. | B60B 3/14 |
| | | | | | | 301/35.54 |
| 4,036,530 | A | * | 7/1977 | Reppert | .................... | B60B 3/14 |
| | | | | | | 301/35.631 |
| 4,135,765 | A | * | 1/1979 | Hardwicke | ............. | B60B 11/06 |
| | | | | | | 301/128 |

(Continued)

FOREIGN PATENT DOCUMENTS

DE    297 06 229 U1    7/1997
DE    199 40 524 A1    4/2001

OTHER PUBLICATIONS

International Search Report issued Nov. 8, 2013, in International Patent Application No. PCT/EP2013/067091 (with English translation of Category of Cited Documents).

*Primary Examiner* — Jeffrey J Restifo

(74) *Attorney, Agent, or Firm* — Oblon, McClelland, Maier & Neustadt, L.L.P

(57) ABSTRACT

A wheel, containing a rim of a plastics material and an adapter for fastening the rim to a wheel mounting, the adapter having a protuberance which engages in a recess in the rim, or the adapter being received in a receptacle of the rime, or, if multiple adapters are used, at least one adapter engaging in a recess of the rim or being enclosed by the material of the rim, where after assembly of the rim, the adapter lies with a surface area against the wheel mounting, or the rim is positioned between the wheel mounting and the adapter, where the fastening means for assembling the rim on the wheel mounting are passed through a lead-through in the adapter and the rim made of the plastics material is connected to the adapter such that no plastics material of the rim lies in the flux of force of the fastening means.

10 Claims, 3 Drawing Sheets

(56) References Cited

U.S. PATENT DOCUMENTS

| | | | | |
|---|---|---|---|---|
| 4,165,904 A * | 8/1979 | Reppert | ............... | B60B 3/14 |
| | | | | 301/35.629 |
| 4,718,732 A * | 1/1988 | Osborne | ............... | B60B 3/147 |
| | | | | 301/128 |
| 5,362,134 A * | 11/1994 | Carmona | ............... | B60B 3/008 |
| | | | | 301/105.1 |
| 5,636,905 A * | 6/1997 | Pagacz | ............... | B60B 3/142 |
| | | | | 301/35.58 |
| 5,785,391 A * | 7/1998 | Parry | ............... | B60B 3/147 |
| | | | | 301/111.04 |
| 6,238,009 B1 * | 5/2001 | Lovitt, Jr. | ............... | B60B 3/044 |
| | | | | 301/35.629 |
| 6,626,502 B1 * | 9/2003 | Petrak | ............... | B60B 3/147 |
| | | | | 301/35.629 |
| 6,685,275 B2 * | 2/2004 | Gorges | ............... | B60B 3/16 |
| | | | | 301/35.621 |
| 7,287,819 B2 * | 10/2007 | McNeil | ............... | B60B 3/002 |
| | | | | 301/35.621 |
| 7,419,226 B2 * | 9/2008 | Jenkinson | ............... | B60B 3/147 |
| | | | | 301/105.1 |
| 7,438,366 B2 * | 10/2008 | Machamer | ............... | B60B 3/008 |
| | | | | 152/396 |
| 7,704,009 B2 * | 4/2010 | Boote | ............... | F04D 29/263 |
| | | | | 301/35.627 |
| 8,911,026 B2 * | 12/2014 | Pruden | ............... | B60B 3/145 |
| | | | | 301/35.621 |
| 2002/0190570 A1 * | 12/2002 | Gorges | ............... | B60B 3/145 |
| | | | | 301/35.629 |
| 2003/0062761 A1 * | 4/2003 | Gorges | ............... | B60B 3/16 |
| | | | | 301/35.629 |
| 2007/0158998 A1 * | 7/2007 | Aron | ............... | B60B 3/147 |
| | | | | 301/110.5 |
| 2014/0049096 A1 * | 2/2014 | Hess | ............... | B60B 30/08 |
| | | | | 301/95.101 |

\* cited by examiner

VEHICLE WHEEL

The invention concerns a vehicle wheel, comprising a rim of a plastics material and at least one adapter for fastening the rim to a wheel mounting, the at least one adapter having at least one protuberance which engages in a recess in the rim, or, if multiple adapters are used, at least one adapter being formed such that it engages in a recess of the rim over its full surface area, the adapter being arranged in such a way that, after assembly of the rim on the wheel mounting, the adapter is positioned between the rim and the wheel mounting, or the adapter being arranged in such a way that the rim is positioned between the wheel mounting and the adapter, so that the adapter lies on the outside of the rim after assembly.

At present, vehicle wheels, in particular vehicle wheels for motor vehicles, are produced from metallic materials, usually from steel or aluminum. The vehicle wheel is fastened to a wheel mounting, usually a brake drum or brake disk of the motor vehicle by spherical-head screws or taper-head screws. As a result, the vehicle wheel is pressed against the mounting and the force transmission to the vehicle wheel for driving the vehicle is brought about by friction between the vehicle wheel and the area of contact of the vehicle wheel on the brake drum or the brake disk.

To reduce the consumption of the motor vehicle, and consequently to save energy, it is intended to reduce the weight of the vehicle. For this purpose, it is endeavored, for example, to produce as many components of the vehicle as possible from materials of low weight, for example from plastics, and to replace the currently used metallic materials by plastics.

It is already known from DE-U 297 06 229 to produce rims for a motor vehicle from a fiber-reinforced plastic. However, on account of the great forces that are transmitted at the rim, the plastic of the rim does have a tendency to creep, which leads to deforming of the rim. Even fiber reinforcement is not sufficient here to prevent the creep, and the associated deformation. Moreover, too high a proportion of fibers, that would ensure sufficient strength with respect to the tendency to creep, has the effect that the material from which the rim was produced becomes too brittle, and consequently does not withstand the loads that occur during driving with the motor vehicle. This is manifested by cracks in the rim, which may lead to rupturing.

It is therefore an object of the present invention to provide a vehicle wheel having a rim of a plastics material with which the force can be transmitted without the plastics material of the rim being damaged.

The object is achieved by a vehicle wheel, comprising a rim of a plastics material and at least one adapter for fastening the rim to a wheel mounting, the at least one adapter having at least one protuberance which engages in a recess in the rim, or the adapter being received in a receptacle of the rim, or, if multiple adapters are used, at least one adapter engaging in a recess of the rim or being enclosed by the material of the rim, the adapter being arranged in such a way that, after assembly of the rim, the adapter lies with a surface area against the wheel mounting, or the adapter being arranged in such a way that the rim is positioned between the wheel mounting and the adapter, so that the adapter lies on the outside of the rim after assembly, the adapter being designed in such a way that fastening means for assembling the rim on the wheel mounting are passed through a lead-through in the adapter and the rim made of the plastics material is connected to the adapter in such a way that no plastics material of the rim lies in the flux of force of the fastening means via the adapter to the wheel mounting.

Being designed in such a way that no plastics material of the rim lies in the flux of force of the fastening means via the adapter to the wheel mounting has the effect that the force is transmitted directly from the wheel mounting to the adapter. It particularly has the effect of avoiding formation in the plastic of edges exposed to forces that could lead to stress peaks in the plastic, whereby the plastic of the rim may be damaged. The force is transmitted to the plastic more uniformly, whereby the risk of damage to the plastic, in particular crack formation, is minimized.

Within the scope of the present invention, the term "rim" is understood as meaning a wheel for a motor vehicle without tires. The rim consequently comprises the rim band with the rim base for receiving the tire and the rim star or the wheel disk or wheel nave.

In order to achieve a uniform force transmission from the adapter to the rim, and thereby avoid individual force peaks from the adapter to the rim, the adapter is preferably connected to the plastics material of the rim in a non-positively engaging, positively engaging or material-bonding manner.

A non-positively engaging connection can be achieved, for example, by the adapter being connected to the plastics material of the rim by screwing in a way appropriate for the plastic. Screwing in a way appropriate for the plastic achieves a connection between the adapter and the plastics material by which a uniform force transmission is possible.

As an alternative to the non-positively engaging connection by screwing in a way appropriate for the plastic, it is also possible to connect the adapter to the plastics material of the rim in a material-bonding or positively engaging manner. For this purpose, it is possible for example to encapsulate the adapter in the plastics material of the rim. Alternatively, it is also possible for the adapter to be pressed into the plastics material of the rim after molding.

For fastening the rim to the wheel mounting, it is possible to use one or more adapters. If multiple adapters are used, it is advantageous to form each adapter with only one protuberance. If only one adapter is used, it is preferred to form it with multiple protuberances. If multiple adapters are used, it is also preferred to form them as segments of a circle or segments of a ring. Furthermore, if multiple adapters are used, it is also possible and preferred to form all the adapters such that they respectively engage over their full surface area in a recess of the rim that is adapted to the shape of the adapter. It is particularly preferred in this respect if the recesses are respectively formed such that the adapter engaging in the recess can be inserted completely into the recess, it being further preferred here if the adapter finishes flush with the surface of the rim.

It is further preferred if both the recess and the adapter do not have any sharp edges. This can be achieved, for example, by the individual edges being respectively rounded off and having a radius.

If multiple adapters are used, it is also possible furthermore to form on each adapter at least one widening, which is enclosed by the plastics material. This may be achieved, for example, by the adapter being encapsulated in the plastics material of the rim. This has the effect that part of the adapter lies in the plastics material of the rim. However, it must be ensured in this respect that the adapter has at least one surface area which finishes flush with the plastics material of the rim, so that this part of the adapter can lie against the wheel mounting.

In a particularly preferred embodiment, the adapter has at least one sleeve, through which a screw for fastening the adapter to the wheel mounting is passed, the sleeve having an outside diameter which corresponds at least to the outside diameter of the screw head of the screw for fastening the adapter.

For assembly, the sleeve is passed through an opening in the rim. The opening is in this case preferably formed in such a way that, after assembly, the sleeve lies against the opening without any play over its entire circumference. It is also possible here to encapsulate the adapter together with the sleeve in the plastics material during the production of the rim. It is preferred, however, to insert the adapter with the sleeve after the production of the rim.

The sleeve and the adapter may be two separate components or one component. It is preferred if the sleeve is formed in one part with the adapter.

In the case of a two-part form, the sleeve may, for example, be connected to the adapter in a non-positively engaging or positively engaging manner. A non-positively engaging connection is, for example, a screwing of the sleeve to the adapter. A positively engaging connection may be obtained, for example, by a welded connection. Preferred, however, is a one-part embodiment, in which the adapter and the sleeve are, for example, produced as one part by a suitable primary forming or shaping process. Casting processes are suitable for example as primary forming processes. Shaping processes are for example milling processes or pressing processes.

In a particularly preferred embodiment, the sleeve is formed in such a way that the screw head of the screw for fastening the adapter to the wheel mounting lies against an end face of the sleeve opposite from the adapter. In this way, the sleeve with the adapter is pressed against the wheel mounting by the screwing, so that the force can be transmitted via the adapter.

For fastening the adapter to the sleeve, it is preferred furthermore if the sleeve is received in an opening in the rim, so that the adapter connected to the sleeve lies with a surface area that is facing in the direction of the sleeve against the rim and the sleeve is fixed to the rim by a nut fastened on an external thread of the sleeve. The rim is consequently braced by the nut between an end face of the adapter that is facing the rim and the nut. In this way, a stable releasable connection of the adapter to the rim is obtained. Such a connection is an example of screwing in a way appropriate for the plastic.

In one embodiment of the invention, the adapter is given the form of a ring and is fastened to the rim by fastening means that are passed through exactly fitting openings in the rim and are connected to the adapter. The adapter additionally has lead-throughs in which fastening means for the assembly of the rim on the wheel mounting are received. Fastening the adapter by fastening means that are passed through exactly fitting openings in the rim and the additional lead-throughs for fastening the rim to the wheel mounting has the effect that the fastening of the adapter to the rim is isolated from the fastening of the wheel to the wheel mounting. Also in this way, the effect of forces acting on the rim of plastics material during operation is reduced and so there is a lessening of the the stress that may lead to the rim being damaged.

In a further embodiment, the lead-throughs in the adapter are connected to a sleeve, through which the fastening means for the assembly of the rim are passed. The sleeves in this case likewise preferably have a diameter which corresponds at least to the diameter of a head of the fastening means, for example of the screw head, in order to avoid plastics material lying in the flux of force from the fastening means via the adapter to the wheel mounting.

It is particularly preferred when the adapter is given the form of a ring if the fastening means by which the adapter is fastened to the rim have a supporting area extending in the radial direction, the bolts or sleeves lying with the supporting surface on the side opposite from the adapter against the rim and the bolts or the sleeves being respectively connected non-releasably to the adapter. The use of bolts or sleeves with the supporting surface that lies against the rim leads to a stable connection of the adapter to the rim.

In one embodiment of the invention, to increase the stability and strength of the rim, portions which extend in the direction of the spokes of the rim are formed on the adapter. If multiple adapters are provided, adapters which are positioned as an extension of a spoke preferably have a corresponding portion that extends in the direction of the spoke. The portion extending in the direction of the spoke may in this case have the same thickness as the adapter or else be formed with a smaller wall thickness. If the portion is formed with a smaller wall thickness, it is preferred if the transition from the thickness of the adapter to the thickness of the portion proceeds smoothly.

The rim is usually screwed to the wheel mounting, the screws being passed through suitable openings in the rim and screwed in a thread of the wheel mounting. According to the invention, the openings in the rim are formed in the adapter, in particular in the sleeve.

As an alternative to screws that are passed through the rim and the adapter and are screwed in holes with an internal thread in the wheel mounting, it is also possible to provide on the wheel mounting threaded bolts, which are passed through the screw through-holes in the adapter and the rim and then fixed by suitable nuts.

The adapter is preferably produced from a material which allows a force transmission between the wheel mounting and the adapter by friction. Suitable materials for the adapter are, for example, metallic materials, ceramics or highly filled plastics. Particularly suitable as the material for the adapter are metals, preferably aluminum, iron, titanium or magnesium, it also being possible for the metals to be mixtures or in the form of alloys. If iron is used, it is preferably in the form of steel. The adapter is in this case produced for example from a deep-drawn steel sheet. Alternatively, the adapter may also be produced from iron as a cast-iron part. Here, the iron may be used both in the form of cast steel and gray cast iron.

Suitable ceramics from which the adapter can be produced are, for example, ceramics based on aluminum oxide or silicon oxide.

If a plastic is used as the material for the adapter, highly reinforced thermosetting plastics are particularly preferred. As a difference from thermoplastic materials and plastics with only little reinforcement, highly reinforced plastics have less of a tendency to creep when a frictional force is applied. Since, moreover, all the forces from the road can be absorbed by the rim, a more brittle material can be used for the adapter than for the rim.

With preference, the material for the rim and the adapter is chosen such that the coefficients of linear thermal expansion of the material for the rim and of the material for the adapter differ by no more than 70%, with preference no more than 60%, on the basis of the coefficient of linear thermal expansion of the material for the adapter. If a plastics material is used as the material for the adapter, the above condition should apply for a temperature range from 100 to 180° C. If a fiber-reinforced plastics material is used as the material for the rim and/or the adapter, the condition should apply to a temperature range from 100 to 180° C. and a linear expansion parallel to the fiber, i.e. in the direction of the fiber.

A thermosetting or thermoplastic material is used as the material for the rim. This material may be used in a filled or unfilled state. With preference, however, filled polymers are used.

Suitable, for example, as polymers are natural and synthetic polymers or derivatives thereof, natural resins and synthetic resins and derivatives thereof, proteins, cellulose derivatives and the like. These may be—but do not have to be—chemically or physically curing, for example air-curing, radiation-curing or temperature-curing.

Apart from homopolymers, copolymers or polymer blends may also be used.

Preferred polymers are ABS (acrylonitrile-butadiene-styrene); ASA (acrylonitrile-styrene-acrylate); acrylated acrylates; alkyd resins; alkylene vinylacetates; alkylene-vinylacetate copolymers, particularly methylene vinylacetate, ethylene vinylacetate, butylene vinylacetate; alkylene-vinylchloride copolymers; amino resins; aldehyde and ketone resins; cellulose and cellulose derivatives, particularly hydroxyalkyl cellulose, cellulose esters, such as acetates, propionates, butyrates, carboxyalkyl celluloses, cellulose nitrates; epoxy acrylates; epoxy resins; modified epoxy resins, for example bifunctional or polyfunctional bisphenol-A or bisphenol-F resins, epoxy-novolak resins, bromated epoxy resins, cycloaliphatic epoxy resins; aliphatic epoxy resins, glycidyl ether, vinyl ether, ethylene-acrylic acid copolymers; hydrocarbon resins; MABS (transparent ABS comprising acrylate units); melamine resins; maleic acid-anhydride copolymers; (meth)acrylates; natural resins; colophony resins; shellac; phenolic resins; polyesters; polyester resins, such as phenylester resins; polysulfones (PSU); polyether sulfones (PESU); polyphenylene sulfone (PPSU); polyamides; polyimides; polyanilines; polypyroles; polybutylene terephthalate (PBT); polycarbonates (for example Makrolon® from Bayer AG); polyester acrylates; polyether acrylates; polyethylene; polyethylene thiophenes; polyethylene naphthalates; polyethylene terephthalates (PET); polyethylene terephthalate glycol (PETG); polypropylene; polymethyl methacrylate (PMMA); polyphenylene oxide (PPO); polyoxymethylene (POM); polystyrenes (PS); polytetrafluorethylene (PTFE); polytetrahydrofuran; polyether (for example polyethylene glycol, polypropylene glycol); polyvinyl compounds, particularly polyvinyl chloride (PVC), PVC copolymers, PVdC, polyvinyl acetate and copolymers thereof, optionally partially hydrolyzed polyvinyl alcohol, polyvinyl acetals, polyvinyl acetates, polyvinyl pyrrolidone, polyvinyl ether, polyvinyl acrylates and methacrylates in solution and as a dispersion as well as copolymers thereof, polyacrylates and polystyrene copolymers; polystyrene (toughened and non-toughened); polyurethanes, uncrosslinked or crosslinked with isocyanates; polyurethane acrylates; styrene acrylonitrile (SAN); styrene-acrylic copolymers; styrene-butadiene block copolymers (for example Styroflex® or Styrolux® from BASF SE, K-Resin™ from TPC); proteins, for example casein; SIS; triazine resin, bismaleimide-triazine resin (BT), cyanate ester resin (CE) or allylated polyphenylene ether (APPE). Furthermore, blends of two or more polymers may be used.

Particularly preferred polymers are acrylates, acrylate resins, cellulose derivatives, methacrylates, methacrylate resins, melamine and amino resins, polyalkylenes, polyimides, epoxy resins, modified epoxy resins, for example bifunctional or polyfunctional bisphenol-A or bisphenol-F resins, epoxy-novolak resins, bromated epoxy resins, cycloaliphatic epoxy resins; aliphatic epoxy resins, glycidyl ether, cyanate ester, vinyl ether, phenolic resins, polyimides, melamine resins and amino resins, polyurethanes, polyesters, polyvinyl acetals, polyvinyl acetates, polystyrenes, polystyrene copolymers, polystyrene acrylates, styrene-butadiene block copolymers, styrene-acrylonitrile copolymers, acrylonitrile-butadiene-styrene, acrylonitrile-styrene acrylate, polyoxymethylene, polysulfones, polyether sulfones, polyphenylene sulfone, polybutylene terephthalate, polycarbonates, alkylene vinylacetates and vinylchloride copolymers, polyamides, cellulose derivatives as well as copolymers thereof and blends of two or more of these polymers.

Particularly preferred polymers are polyamides, for example polyamide 4, polyamide 6, polyamide 11, polyamide 12, polyamide 4.6, polyamide 6.6, polyamide 6.10, polyamide 6.12, polyamide 10.10, polyamide 12.12, polyamide MXD.6, polyamide 6/6.6, polyamide 6/12, polyamide 6.6/6/6.10, polyamide PACM.12, polyamide 12/MACM.I, and polyphthalamides, that is to say polyamides of which the dicarboxylic acid component comprises at least 50% by weight terephthalic acid and/or isophthalic acid. Particularly preferred are polyamide 4.6, polyamide 6, polyamide 6.6, polyamide 6.T/6, polyamide 6.T/6.I, polyamide 6.T/6.I/6.6, polyamide 10.T/6.T, polyamide 6.6/6.10, polyamide 6.6/6.12, polyamide 6.T/11, polyamide 6.T/12, polyamide 6.T/5-1.T, polyamide 9.T/8-1.T and mixtures of these. Further suitable polymers are polypropylene, polysulphones, polyether sulfones, polyphenylene sulfones, polybutylene terephthalate and mixtures thereof.

Customary additives may be admixed with the individual polymers, for example plasticizers, crosslinking agents, impact modifiers or flame retardants.

The polymer material is preferably reinforced. In particular, the polymer material is fiber-reinforced. Any fibers that are customary for reinforcement and are known to a person skilled in the art may be used for the reinforcement. Suitable fibers are, for example, glass fibers, carbon fibers, aramid fibers, boron fibers, metal fibers, mineral fibers or potassium titanate fibers. The fibers may be used in the form of short fibers, long fibers or continuous fibers. The fibers may also be oriented or randomly arranged in the polymer material. In particular when continuous fibers are used, however, an oriented arrangement is usual. The fibers may in this case be used for example in the form of individual fibers, fiber strands, mats, woven or knitted structures or rovings. If the fibers are used in the form of continuous fibers, as rovings or as fiber mats, the fibers are usually placed in a mold and then encapsulated with the polymer material. The rim produced in this way may be a single-layered or multi-layered construction. In the case of a multi-layered construction, the fibers of the individual layers may in each case be directed in the same direction or the fibers of the individual layers are turned at an angle of −90° to +90° in relation to one another.

Within the scope of the present invention, short fibers are understood as meaning fibers with a length in the granular material of less than 5 mm. Long fibers are fibers in a granular material with a length in the range from 5 to 30 mm, with preference in the range from 7 to 20 mm. The processing of the granular material has the effect that the long fibers are generally shortened, so that in the finished component they generally have a length which may extend in the range from 0.1 mm to the maximum dimension of the granular material that is used. With conventionally used granular material sizes, the maximum length lies in the range of up to 12 mm. In the case of a granular material with greater dimensions, the maximum length of the fibers may also be greater than that.

Long fibers are used with preference. If long fibers are used, they are usually admixed with the polymer compound before curing. The main body of the wheel body may be produced, for example, by extrusion, injection molding or casting. With preference, the whole wheel body is produced by injection molding or casting. The long fibers are generally randomly arranged in the wheel body. If the wheel body is produced by an injection-molding process, the long fibers may be oriented by the polymer compound that comprises the fibers being forced through an injection nozzle into the mold. The proportion of the fibers in the polymer compound is preferably 30 to 70% by weight, in particular 45 to 65% by weight.

In a further embodiment, the polymer material comprises a mixture of short fibers and long fibers. In this case, the proportion of long fibers in the overall fiber fraction is preferably 5 to 95% by weight and the proportion of short fibers is correspondingly 95 to 5% by weight. With particular preference, the proportion of long fibers on the basis of the overall fiber fraction lies in the range from 15 to 85% by weight and the proportion of short fibers is correspondingly 85% by weight to 15% by weight.

In addition to the fibers, the plastics material may also comprise any other fillers that are known to a person skilled in the art and have the effect of increasing stiffness and/or strength. These also include, inter alia, any desired particles without a preferential direction. Such particles are generally spherical, plate-shaped or cylindrical. The actual form of the particles may in this case deviate from the idealized form. Thus, spherical particles in particular may in reality also be for example droplet-shaped or flattened.

Apart from fibers, reinforcing materials that are used are, for example, graphite, chalk, talc and nanoscale fillers.

Glass fibers or carbon fibers are used with particular preference for reinforcement. Glass-fiber-reinforced polyamides are particularly preferred as the material for producing the rim.

If polyamides are used for reinforcement, it is possible to produce the rim by what is known as a polyamide RIM process. For this purpose, continuous fibers are placed in a mold and impregnated with a monomer solution. The monomer solution is subsequently cured to form the polymer.

In a particularly preferred embodiment, the polymer material from which the wheel is produced comprises 30 to 70% by weight, with preference 35 to 65% by weight, of a polyamide or a blend of at least two different polyamides and 30 to 70% by weight, with preference 45 to 65% by weight, of glass fibers. Suitable in particular as polyamides are PA 6, PA 4.6, PA 6.6, PA 6.10, PA 6.12 or partly aromatic polyamides, for example PA 6.T/6, PA 6.T/11, PA 6.T/12, PA 6.T/6-3.T, PA 6.T/6.6, PA 6.T/6.I, PA 6.I/6. T, PA 6.T/5-I.T, PA 6.T/6.I/6.6, PA 6.T/6.I/11, PA 6.T/6.I/12, PA 6.T/6.I/6.10, PA 6.T/6.I/6.12, PA 9.T/8-I.T, PA 6.T/10.T, PA 10.T/6.T, PA 10.T/6-3. T, PA 6.T/6.I/10.T/10.I, PA 6.T/6.I/8.T/8.I, PA 6.T/6.I/PACM.T/PACM.I, PA 6.T/6.I/MACM.T/MACM.I, PA 6.T/6.12, PA 6.T/6.10, PA 8.T/8.6, PA 8.T/8.I, PA 6.T/6.I/MXD.T/MXD.I or other polyamides comprising terephthalic acid and/or isophthalic acid, and mixtures thereof. Preferably used as reinforcing fibers are glass fibers or carbon fibers in the form of short fibers or long fibers and mixtures thereof. In a preferred form, the cross section of the fibers is in this case round, but they may also have cross sections that are not round, for example oval or flattened.

Apart from the polyamide and the glass fibers, the polymer material that is used with preference comprises 0 to 30% by weight, with preference 0 to 15% by weight, of an impact modifier, 0 to 1% by weight of a heat stabilizer comprising copper, for example CuI/KI, 0 to 5% by weight of a black pigment, for example carbon black, 0 to 1% by weight of a lubricant or a mold release agent, for example N,N'-ethylene bisstearamide, for example Acrawax C®, 0 to 1% by weight of a phosphitic (secondary) antioxidant, for example tris(2,4-di-(tert)-butylenphenyl)phosphite, for example Irgafos 168®, 0 to 1% by weight of a phenolic (primary) antioxidant, for example N,N'-hexamethylene bis[3-(3,5-di-t-butyl-4-hydroxyphenyl)propionamide], for example Irganox 1098®, 0 to 1% by weight of a hindered amine stabilizer (HALS), for example 1,3-benzyl dicarboxamide, N,N'-bis(2,2,6,6-tetramethyl-4-piperidinyl), for example obtainable as Nylostab S-EED®).

Furthermore, for enhanced heat stabilization, it may comprise 0 to 2% by weight of a polyethyleneimine homopolymer or copolymer, for example Lupasol WF®, and 0 to 20% by weight of iron powder. Preferred iron powders are obtainable by thermal decomposition of iron pentacarbonyl.

For an antistatic finish, also suitable is 0 to 20% by weight of additives comprising carbon, for example conductive carbon black, carbon nanotubes, carbon fibers and "vapor grown carbon nanotubes".

Preferably used as impact modifiers are ethylene copolymers or ethylene methacrylate copolymers. The ethylene copolymer may in this case be functionalized with 0.1 to 1% of maleic anhydride. Preferably used as comonomers are 1-butene and 1-octene. If 1-butene is used as the comonomer, the ethylene preferably has a proportion by weight of 55 to 85.7% and, if 1-octene is used as the comonomer, it preferably has a proportion of weight of 50 to 64.9% auf. The proportion of 1-butene is correspondingly 14 to 44% by weight and that of 1-octene 35 to 49%, respectively. Acrylic acid, maleic acid or maleic anhydride may be used as the reactive acid. The proportion of the reactive acid is preferably 0.3 to 1% by weight. Apart from 1-butene and 1-octene, 1-hexene is alternatively also suitable as a comonomer.

EXAMPLES OF SUITABLE POLYMER MATERIALS

Hereafter, additive blend 1 means that the mixture comprises 0.15% by weight of a CuI/KI-mix, 1.64% by weight of carbon black, 0.25% by weight of Acrawax C® (N,N' -ethylene bisstearamide), 0.10% by weight of Irgafos 168® (tris(2, 4-di-(tert)-butylenephenyl)phosphite), 0.10% by weight of Irganox 1098® (N,N'-hexamethylene bis[3-(3,5-di-t-butyl-4-hydroxyphenyl)propionamide]), and 0.30% by weight of Nylostab S-EED® (N,N'-bis(2,2,6,6-tetramethyl-4-piperidinyl)).

Additive blend 2 comprises 0.25% by weight of Lupasol WF® (polyethyleneimine), and 1.0% by weight of carbonyl iron powder.

Example 1

A suitable polymer blend is made up of PA 6.6/6.10 in a ratio of 60/40% by weight. It also comprises 60% by weight of long glass fibers, 4% by weight of ethylene copolymer as an impact modifier, for example Fusa bond® N416, and additive blend 1.

Example 2

A further suitable polymer blend corresponds largely to that described in Example 1. However, instead of the 4% by weight of ethylene copolymer as an impact modifier, it comprises 8% by weight.

Example 3

A further alternative polymer blend corresponds to that in Example 1, comprising instead of the 60% by weight of long glass fibers 40% by weight of long fibers and 20% by weight of short glass fibers.

Example 4

A further possible polymer blend comprises PA 6.10 and 60% by weight of long glass fibers. Here, too, it additionally comprises additive blend 1.

Example 5

A further polymer blend for producing the wheel corresponds to that in Example 4, but additionally comprising as an impact modifier 4% by weight of ethylene-methacrylic acid copolymer (90/10), neutralized to about 70% with zinc, for example Surlyn® 9520.

Example 6

A further suitable polymer blend corresponds to the composition in Example 4, but using a PA6.6 instead of PA6.10.

Example 7

A further suitable polymer blend corresponds to the composition in Example 6, additionally comprising as an impact modifier 4% by weight of an ethylene copolymer functionalized with about 1% maleic anhydride, for example Fusabond N493®.

Example 8

A further suitable polymer blend corresponds to that in Examples 4 and 6, but using a PA 6.6/6I/6.T with a mixing ratio of 70:30% by weight as the polyamide.

Example 9

In a further embodiment, 4% by weight of an ethylene copolymer functionalized with 0.5 to 1% of maleic anhydride, for example Exxelor® VA1803, as an impact modifier is admixed with the polymer blend from Example 8.

Example 10

In a further embodiment, a PA 06.T/6 with an average viscosity number of 100 ml/g is used as the polymer. It additionally comprises 60% by weight of long glass fibers and additive blend 1.

Example 11

In a further alternative embodiment, 4% of an ethylene copolymer functionalized with 0.2 to 0.3% of maleic anhydride, for example Fusabond® NM 598 D, is added as an impact modifier to the polymer blend from Example 10.

Example 12

A further suitable polymer blend corresponds to that from Example 1, while additionally adding additive blend 2.

Example 13

In a further embodiment, additive blend 2 and 6% by weight of PA6 are admixed to the polymer blend from Example 6.

Example 14

A further suitable polymer blend corresponds to that from Example 7, while additionally adding polymer blend 2 and 6% by weight of PA6.

Example 15

A further alternative polymer blend comprises PA 6.6/6.10 in a ratio of 60/40% by weight, 56% by weight of long glass fibers, 4% by weight of ethylene copolymer as an impact modifier, for example Fusabond® N416, 4% by weight of conductive carbon black, for example Printex® XE2 from Evonik or Chesacarb A, and additive blend 1.

Example 16

A further polymer blend comprises PA 6.6/6.10 in a ratio of 60/40% by weight, 58% by weight of long glass fibers, 4% by weight of ethylene copolymer as an impact modifier, for example Fusabond® N416, 2% by weight of carbon nanotubes, for example Nanocyl® NC 7000, and additive blend 1.

Example 17

A further suitable polymer blend comprises PA 6.6/6.10 in a ratio of 60/40% by weight, 40% by weight of long glass fibers, 4% by weight of ethylene copolymer as an impact modifier, for example Fusabond® N416, 15% by weight of carbon fibers, for example Tenax®-J/E, type HT C604, and additive blend 1.

Example 18

In a further embodiment, the polymer blend comprises PA 6.6/6.10 in a ratio of 60/40% by weight, 58% by weight of long glass fibers, 4% by weight of ethylene copolymer as an impact modifier, for example Fusabond® N416, 2% by weight of vapor grown carbon nanotubes, for example VGCF® oder VGCF®-H from the company Showa Denko, and additive blend 1.

Embodiments of the invention are explained in more detail in the description which follows and are represented in the figures, in which:

FIG. 1 shows a section through a rim of a motor vehicle.

Figure 1:
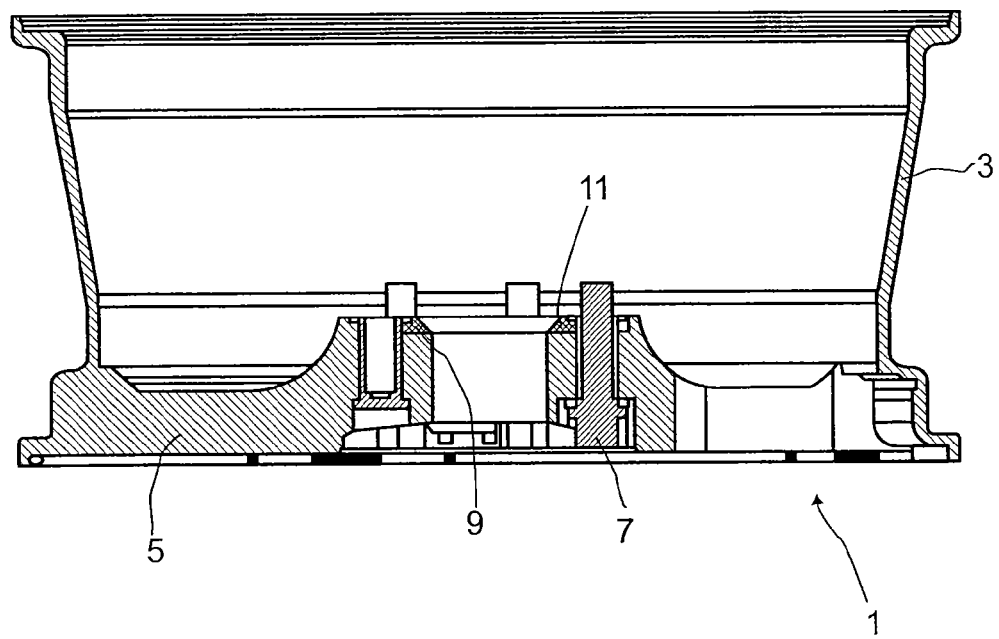
FIG. 1 is a sectional representation of a vehicle rim.

A rim 1 comprises a rim base 3 and a rim star 5. As an alternative to a rim star 5, the rim may also have a wheel nave.

The rim 1 is screwed to a wheel mounting (not represented here), usually a brake drum or a brake disk, by wheel bolts 7.

According to the invention, the rim 1 is produced from a plastics material. On account of the low strength of plastics and the tendency to creep under shearing forces that occur, the rim 1 cannot be fastened directly to the wheel mounting. For this reason, an adapter 9 is used for this. After assembly, the adapter 9 lies with a surface area 11 against the wheel mounting.

Figure 2:
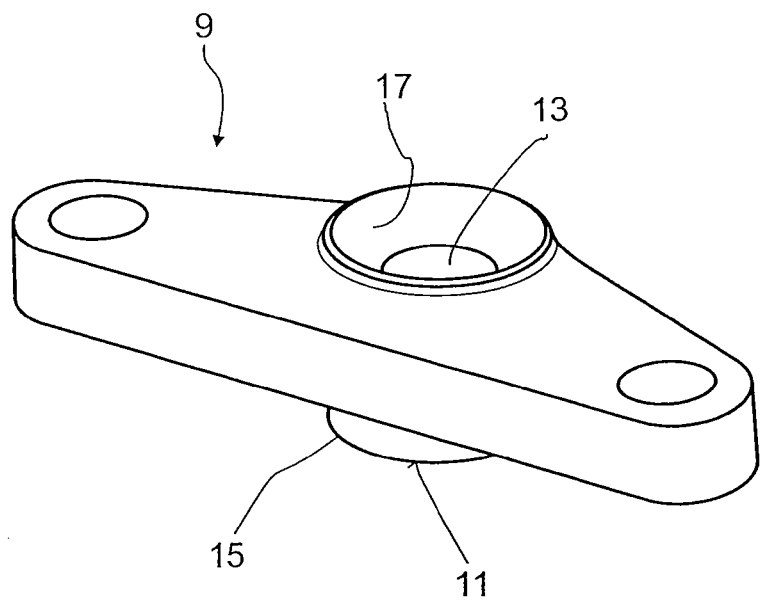
FIG. 2 shows a three-dimensional representation of an adapter in a first embodiment.

An adapter of a first embodiment is represented by way of example in FIG. 2.

The adapter 9 represented in FIG. 2 has a central lead-through 13, through which the wheel bolt 7 is passed during assembly.

The adapter represented in FIG. 2 is formed in such a way that it is completely enclosed by the material of the rim. In the region of the lead-through 13, the adapter 9 has a continuation 15, which during assembly extends in the direction of the wheel mounting.

After assembly, the continuation 15 lies with the surface area 11 against the wheel mounting.

On the side opposite from the continuation 15, the lead-through 13 is formed with a receptacle 17 for a head of a spherical-head screw. The spherical-head screw serves in this case as a wheel bolt 7. After assembly, the spherical head of the spherical-head screw lies against the receptacle 17.

According to the invention, the continuation 15 and the receptacle 17 are configured with a diameter which is at least as large as the diameter of the head of the wheel bolt by which the rim is fastened to the wheel mounting. This ensures that there is no plastics material in the flux of force of the fastening means via the adapter to the wheel mounting.

Figure 3:
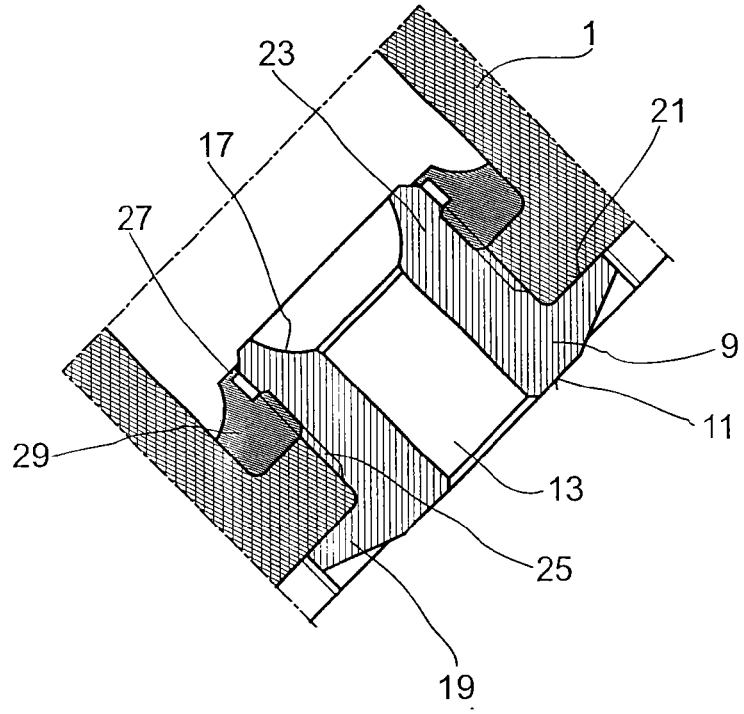
FIG. 3 shows a sectional representation of an adapter in a second embodiment.

An adapter of a second embodiment is represented in FIG. 3.

The adapter represented in section in FIG. 3 has an adapter plate 19, which lies with a surface area 21 against the rim 1. The surface area 21 is connected in one piece to a sleeve 23. The sleeve 23 is passed through an opening 25 in the rim 1. Here, the sleeve is formed so as to fit the opening 25 exactly, so that the sleeve 23 lies against the opening 25 over its entire circumference.

The sleeve 25 also has an external thread 27, onto which a nut 29 is screwed. With the nut 29, the adapter 9 is releasably connected to the rim 1.

Also in the embodiment represented in FIG. 3, the outside diameter of the sleeve 23 is formed so as to be larger than a screw head of a screw by which the rim 1 is fastened to the wheel mounting. For fastening, the screw, usually a wheel bolt, for example in the form of a spherical-head screw, is passed for this purpose through the lead-through 13 in the sleeve. On the side facing away from the wheel mounting, the lead-through 13 is provided with a receptacle 17, which is formed in such a way that the spherical head of the spherical-head screw lies against the receptacle 17 after assembly of the rim 1 on the wheel mounting.

If, instead of the spherical-head screw, a different screw is used for fastening the rim to the wheel mounting, the receptacle 17 is formed correspondingly, so that also in this case the screw head lies with its surface area flush against the receptacle 17 after assembly of the rim 1 on the wheel mounting. Thus it is possible, for example, to form the receptacle 17 conically if a taper-head screw is used as the wheel bolt for fastening the rim.

Figure 4:
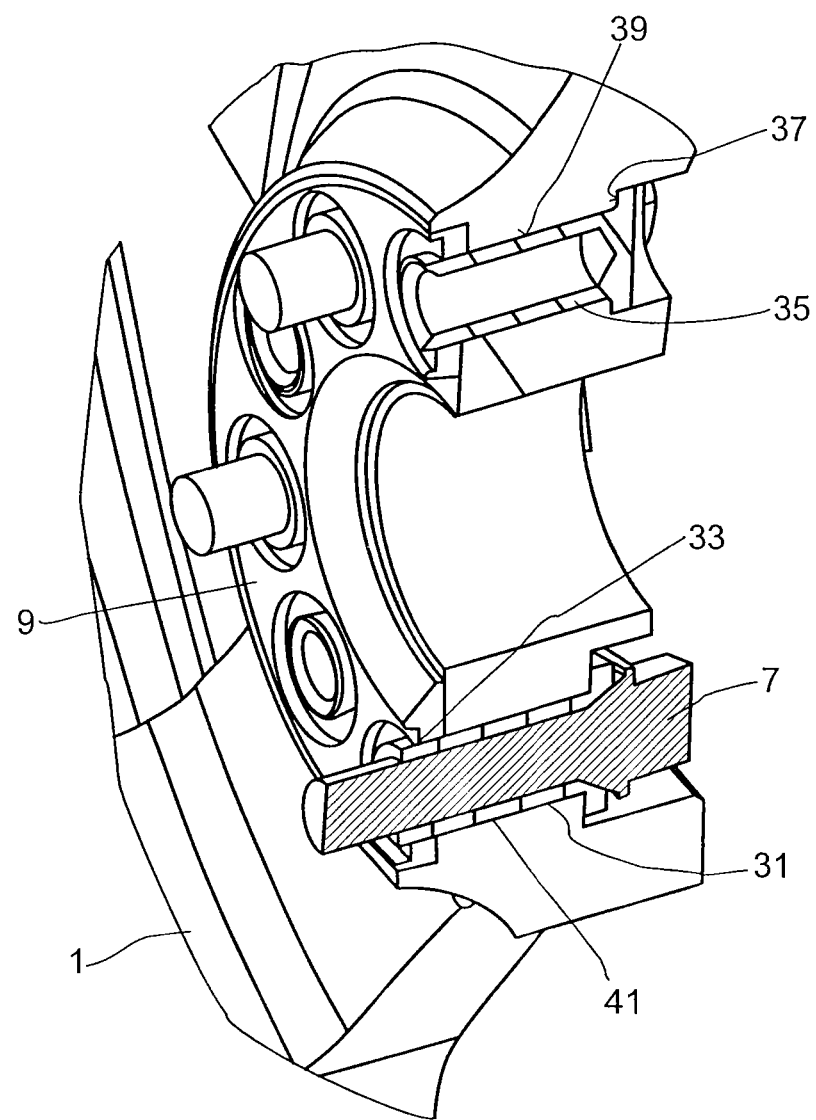
FIG. 4 shows a three-dimensional sectional representation of an adapter in a third embodiment.

In FIG. 4, an adapter of a third embodiment is represented.

The adapter shown in FIG. 4 corresponds to that also shown in FIG. 1.

The adapter 9 is in this case formed as a ring and lies against the rim 1. The adapter 9 has openings, through which sleeves 31 are passed, the sleeves 31 lying with an exact fit against lead-throughs 33 in the adapter 9.

The wheel bolt 7 for fastening the rim to the wheel mounting is passed through the sleeve 31.

The fastening of the adapter 9 to the rim 1 takes place by means of bolts or sleeves 35. In the embodiment represented here, sleeves 35 are used. The sleeve 35 has a supporting surface 37, with which the sleeve 35 lies on the rim 1 on the side opposite from the adapter 9. For assembly, the adapter 9 is inserted into a corresponding receptacle of the rim 1, and the sleeves 35 are then passed through corresponding lead-throughs 39. Then, the sleeve 35 is connected to the adapter 9. The connection is in this case preferably not releasable. Suitable non-releasable connections are, for example, welded connections. The use of sleeves 35 or bolts by which the adapter is fastened to the rim 1 and the use of additional sleeves 31 through which the wheel bolts 7 are passed have the effect that the function of the connection of the rim 1 to the wheel mounting is isolated from the function of the connection of the adapter 9 to the rim 1. This also ensures that no plastic lies in the region of the flux of force from the wheel bolt 7 via the adapter 9 to the wheel mounting.

In the embodiment represented in FIG. 4, the lead-throughs 39 and preferably likewise lead-throughs 41 for the sleeves 31 are dimensioned in such a way that the sleeves 31 and the sleeves 35 lie with their outer surface against the respective lead-throughs 33, 41 with an exact fit.

LIST OF DESIGNATIONS

1 Rim
3 Rim base
5 Rim star
7 Wheel bolt
9 Adapter
11 Surface area
13 Lead-through
15 Continuation
17 Receptacle
19 Adapter plate
21 Surface areas
23 Sleeve
25 Opening
27 External thread
29 Nut
31 Sleeve
33 Lead-through
35 Sleeve
37 Supporting surface
39 Lead-through
41 Lead-through

The invention claimed is:

1. A vehicle wheel, comprising a rim of a plastics material and at least one adapter for fastening the rim to a wheel mounting, the rim comprising a rim band with a rim base adapted for receiving a tire and a rim star or a wheel disk or a wheel nave, the at least one adapter having at least one protuberance which engages in a recess in the rim, or the adapter being received in a receptacle of the rim, or, if multiple adapters are used, at least one adapter engaging in a recess of the rim or being enclosed by the material of the rim, the adapter being arranged in such a way that, after assembly of the rim, the adapter lies with a surface area against the wheel mounting, or the adapter being arranged in such a way that the rim is positioned between the wheel mounting and the adapter, so that the adapter lies on the outside of the rim after assembly, wherein the adapter is designed in such a way that fastening means for assembling the rim on the wheel mounting are passed through a lead-through in the adapter and the rim made of the plastics material is connected to the adapter in such a way that no plastics material of the rim lies in the flux of force of the fastening means via the adapter to the wheel mounting, wherein the adapter has at least one sleeve, through which a screw adapted for fastening the adapter to the wheel mounting is passed, the sleeve having an outside diameter which corresponds at least to the outside diameter of the screw head of the screw for fastening the adapter, wherein the sleeve is connected to the adapter in a non-positively or positively engaging manner.

2. The vehicle wheel according to claim 1, wherein the adapter is connected to the plastics material of the rim in a non-positively engaging, positively engaging or material-bonding manner.

3. The vehicle wheel according to claim 1, wherein the adapter is encapsulated by the plastics material of the rim.

4. The vehicle wheel according to claim 1, wherein the adapter is pressed into the plastics material of the rim after the molding of the rim.

5. The vehicle wheel according to claim 1, wherein no sharp edges act on the plastics material in the region of the connection of the adapter to the wheel mounting.

6. The vehicle wheel according to claim 1, wherein the sleeve is formed in such a way that the screw head of the screw for fastening the adapter to the wheel mounting lies against an end face of the sleeve that is opposite from the adapter.

7. The vehicle wheel according to claim 1, wherein the sleeve is received in an opening in the rim, so that the adapter connected to the sleeve lies with a surface area that is facing in the direction of the sleeve against the rim and the sleeve is fixed to the rim by a nut fastened on an external thread of the sleeve.

8. The vehicle wheel according to claim 1, wherein the adapter is given the form of a ring and is fastened to the rim by fastening means that are passed through exactly fitting openings in the rim and are connected to the adapter, the adapter additionally having lead throughs in which fastening means for the assembly of the rim on the wheel mounting are received.

9. The vehicle wheel according to claim 8, wherein the lead-throughs are connected to a sleeve, through which the fastening means for the assembly of the rim are passed.

10. The vehicle wheel according to claim 8, wherein the fastening means by which the adapter is fastened to the rim are bolts or sleeves which have a supporting area extending in the radial direction, the bolts or sleeves lying with the supporting surface on the side opposite from the adapter against the rim and the bolts or the sleeves being respectively connected non-releasably to the adapter.

* * * * *